Oct. 13, 1970  D. T. O'SHEA  3,533,686
EYE PROTECTIVE GOGGLES WITH REMOVABLE AND ROTATABLE HALF LENSES
Filed June 21, 1966  2 Sheets-Sheet 1

INVENTOR
DONALD T. O'SHEA
BY
Baldwin, Doran & Egan
ATTORNEYS

Oct. 13, 1970   D. T. O'SHEA   3,533,686
EYE PROTECTIVE GOGGLES WITH REMOVABLE AND ROTATABLE HALF LENSES
Filed June 21, 1966   2 Sheets-Sheet 2

INVENTOR
DONALD T. O'SHEA
BY
*Baldwin, Doran & Egan*
ATTORNEYS

United States Patent Office 3,533,686
Patented Oct. 13, 1970

3,533,686
EYE PROTECTIVE GOGGLES WITH REMOVABLE AND ROTATABLE HALF LENSES
Donald T. O'Shea, 12970 Lake Ave.,
Lakewood, Ohio 44107
Filed June 21, 1966, Ser. No. 559,269
Int. Cl. G02c 7/02; A61f 9/02
U.S. Cl. 351—61      1 Claim

ABSTRACT OF THE DISCLOSURE

An eye protective headpiece having at least one sight-opening aperture with a single removable half magnification lens of approximately half the size of the aperture disposed therein so as to occupy either the upper half or the lower half of the aperture to provide a magnified viewing portion and an unmagnified view portion to enable a wearer to selectively view close objects or distant objects. In one form of the invention, the half magnification lens is circumferentially rotatable within the sight-opening aperture, thereby enabling the wearer to position the magnification lens in any one of a plurality of positions therein.

---

This invention relates to eye protective headpieces such as welder's helmets and plain or cover-all type goggles worn for oxyacetylene welding or cutting and to such headpieces worn for grinding, chipping, and scaling of metals.

In many types of work requiring the use of such headpieces it is often desirable, particularly when viewing small detailed work, that the eyepiece therein furnish plus magnification power to provide the wearer with an enlarged or magnified view of the work. Although this may be effected by inserting conventional plus magnification lenses in current type headpieces, the wearer is restricted to an enlarged or magnified view only and does not have the highly desirable choice of selecting either a normal (non-magnified) view or a magnified view.

One-piece bifocal goggle lenses are prohibitively expensive. Such expense is further compounded by the fact that each individual job may require a pair of lenses of a particular magnification power, thereby necessitating the stocking of a plurality of pairs of expensive bifocal lenses.

Therefore, it is an object of this invention to provide practical, inexpensive bifocal viewing in eye protective headpieces.

A further object of the invention is to provide an eye protective headpiece containing a removable half-size magnification lens in the sight opening(s) thereof and also containing the usual conventional forwardly disposed filter and/or safety glass lenses disposed forwardly of the magnification lens.

A further object of the invention is to provide safety goggles containing removable half-size magnification lenses that are semi-circular in configuration and are disposed in the lower portion of the goggle eyecup thereby providing in each eyecup, a lower magnification viewing portion for viewing close work, and a clear upper viewing portion for distant viewing.

A further object of the invention is to provide a pair of safety goggles of the above type wherein the lens or lenses therein may be changed by a quick and simple operation.

A further object of the invention is to provide safety goggles of the above type that are simple in construction, inexpensive to manufacture, and highly effective in operation.

Briefly, the foregoing objects are accomplished by the provision of eye protective headpieces such as, for example, safety goggles wherein the sight aperture in each eyecup is provided, in one form of the invention, with a removable magnification lens of semi-circular configuration and, preferably, is disposed in the lower portion of the eyecup, with a protective (clear) cover lens disposed in the eyecup outwardly of the magnification lens. Thus, the lower half portion of each eyecup provides a magnified view for closeup work, while the upper portion thereof provides an unmagnified clear view for viewing distant objects. In practice, the wearer selects the correct pair of magnification lenses as required by the particular job called for and simply inserts such lenses into operative position in the goggles. Thus, the invention inexpensively accomplishes the plus magnification feature found in a bifocal lens by employing, in goggles, a single, separate portional magnification lens in coaction with a full (clear) cover lens. With this construction, inexpensive bifocal viewing in conventional goggles is effected.

In another form of the invention, each eyecup includes an annular resilient snap ring detachably fitted to the forward exterior of the eyecup and having a sight opening in line with and forming a part of the eyecup sight aperture. This snap ring has an interior annular lens retaining groove encircling the sight opening for detachably receiving the magnification lens. Such snap ring may be provided with a second annular groove disposed outwardly of the first groove for receiving a filter lens or a safety glass lens. The snap ring is detachably disposed on the eyecup with a fit permitting such ring to be selectively rotated on the eyecup whereby the magnification lens may be disposed in either an upper or lower position on the eyecup as desired. The magnification lens groove may be provided with a pair of oppositely spaced, horizontally disposed stop tabs to prevent such lens from rotating circumferentially in said groove. With this construction, substantially inexpensivev bifocal viewing is effected in welding or safety-type goggles.

Other objects and advantages of the invention will be apparent from the following description taken in conjunction with the drawings, wherein.

Figure 1:
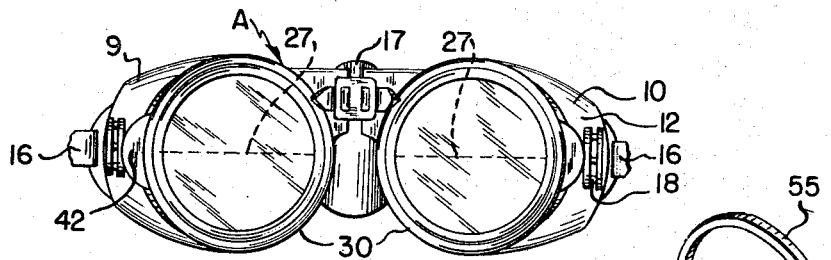
FIG. 1 is a front elevational view of a pair of safety goggles constructed in accordance with the invention.
Figure 3:
FIG. 3 is a front elevational view of the magnification lens shown in FIG. 2.

Although the invention is shown and described herein particularly with reference to safety goggles, it will be understood that it may be applied to anp type of eye protective headpiece. Goggles are preferred in a majority of applications as they do not obstruct peripheral vision as in the mase of coverall type headpieces.

Referring first to FIGS. 1 through 5 wherein there is illustrated one form of the invention, there is shown a pair of safety goggles, generally designated as A, constructed in accordance with the invention, and comprising a pair of spaced, one-piece, left and right eyecups or eyecup housings 9 and 10. Since, for the purposes of the invention, the eyecups are identical, the structure of only one will be described herein in detail.

Each eyecup is formed with a face engaging rear edge 11 shaped to the general contour of the eye encircling portions of the face, and an annular front portion 12 having a sight opening in the form of a recessed cylindrical lens receiving aperture or bore 13 for receiving one or more lenses, such as a cover lens 15. The eyecups have a suitable head band 16 secured thereto in a conventional manner to hold the goggles in position on a wearer's face. The eyecups are connected centrally by a conventional bridge member or nose piece 17. Disposed in the side of each eyecup housing is a conventional air vent 18. The eyecup housings may be formed of any suitable resilient opaque material, although, in the preferred form, a resilient thermoplastic type of material such as polyvinyl chloride may be used.

As aforementioned, each eyecup housing has a lens receiving cylindrical bore 13 formed therein, said bore terminating in an annular shoulder or lens seat 22. The bore 13 may be formed deep enough to accommodate one or more lenses in one form of the invention. Also, the bore may receive a single lens of substantial thickness as may be required in certain applications. The lens seat 22 may contain a plurality of upstanding tabs or projections 26 formed circumferentially around the seat and extending outwardly therefrom for receiving the lens or lenses thereagainst. The tabs 26 are resilient to the extent that they partially flex or bend when a lens is pressed thereagainst.

The terms lens or full lens as used herein means a full circular lens, such as the lens 15, and may be any type of conventional lens such as a cover lens or a filter lens.

A feature of the invention is the magnification lens 27 which, in one preferred form, is a half circular lens having plus magnification power and adapted for placement in goggles. Such magnification lens may be disposed in either the upper portion of the sight opening 13 or, preferably, in the lower portion thereof, as shown. When disposed in the lower portion of the opening, for example, the viewer may selectively look through the lower portions of such opening for securing a magnified view for viewing close-up objects, or look through the (clear) top portion of the opening for viewing distant objects. The lens 27 may be used in coaction with a cover lens 15, with either or both of such lenses being disposed the aperture 13 and retained therein by the snap ring 30 in a manner to be described.

In another form of the invention, the lenses 15 and 27 may be detachably secured in position in the lens receiving annular grooves 28 and 29 formed in the bore of the annular, cylindrical, resilient (lens retaining) snap cap or ring 30. The snap ring 30 contains spaced outer flanges 34 and 36 at the respective ends thereof. The flange 34 is adapted to fit over the eyecup housing flange 40 in coaction therewith to snugly retain the snap ring 30 on the eyecup housing. In practice, the snap ring 30 is adapted to be flexed or stretched to fit over the flange 40 of the eyecup housing, said snap ring having a gripping tab 42 for ease in thus applying the ring to the eyecup.

Thus, either or both of the lenses 15 and 27 may be disposed in the eyecup sight opening or aperture 13 and retained therein by the snap ring 30; or, such lenses may be disposed in the grooves 28 and 29 in the snap ring 30, with such snap ring being detachably snap-fitted onto the eyecup.

With this construction, lenses may be changed in the goggles by a quick and simple operation simply by stretching the snap ring 30 over the eyecup flange 40, such lenses being retained in operative position in the goggles by a secure, snug fit.

The present construction also permits front insertion of the lens (or lenses) into the eyecup. More specifically, with the snap ring 30 in position on the eyecup, the lens 27 may be quickly inserted partially through the snap ring 30 and slipped in the snap groove 29 for positioning therein. Thence, the lens 15 may be inserted in the groove 28. In fact, the snap ring 30 could be formed integral with the eyecup whereby said front insertion method of the lenses would be the main means for positioning the lenses in the eyecup. The snap ring 30 is of sufficient resiliency to permit such front insertion of the lens.

The snap ring 30 is circumferentially rotatable on the eyecup 360 degrees, when operatively positioned thereon, thereby enabling the wearer to position the magnification lens 27 in any one of a plurality of circumferential positions on the eyecup. However, the lower position, as shown in FIG. 1, is normally preferred.

Thus, there is provided a single, unitary, semi-circular magnification lens 27 of lesser size than the sight opening of the goggle and detachably disposed therein to occupy only a portion of the sight opening to provide magnified and unmagnified portions thereof for selective close and distant viewing, respectively. The snap ring 30 forms a part of the goggle and has a sight opening 43 (containing the grooves 28 and 29) forming a part of and in line with the sight opening or aperture 13 of the goggle.

The groove 29 may contain a pair of coacting oppositely disposed tabs 50 and 51 (FIGS. 4 and 5) contacting the flat straight edge of the lens 27 for preventing such lens from sliding or turning circumferentially in the groove 29.

Figure 9:
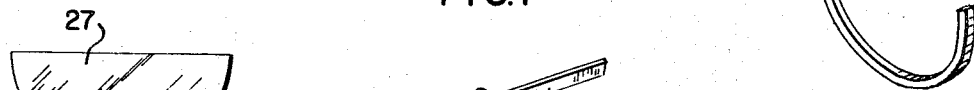
FIG. 9 is a perspective view of a retaining ring which may be employed to facilitate assembly of the parts shown in FIG. 2.
Figure 2:
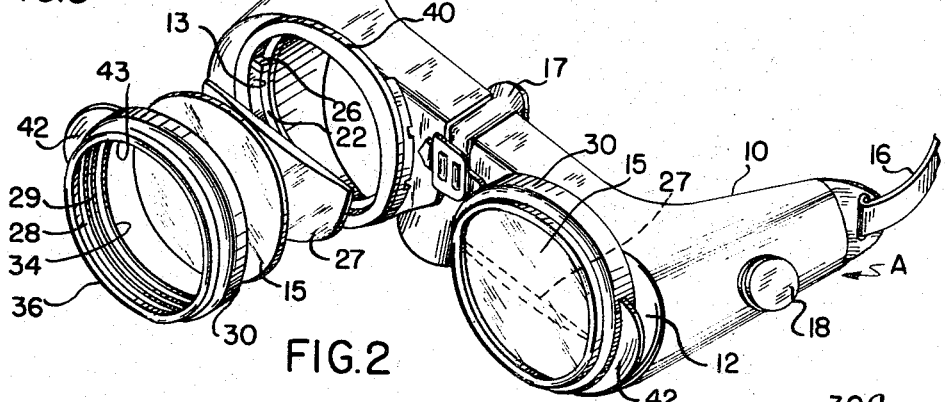
FIG. 2 is an exploded perspective view of the safety goggles shown in FIG. 1 and showing the relative position of the parts thereof prior to assembly.
Figure 4:
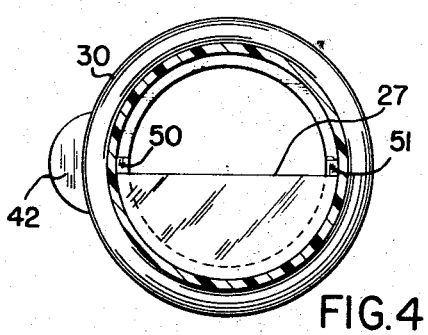
FIG. 4 is a front elevational view of the assembled snap ring assembly shown in FIG. 2 and taken along the line 4—4 of FIG. 5.

When a lens or lenses are positioned in the eyecup sight opening 13, a retaining ring 55 (FIG. 9) may be snapped over the eyecup flange 40 to assist in keeping such lens or lenses in position in the opening 13 during assembly of the snap ring 30 on the eyecup.

It will be understood that one or more lenses may be disposed in the eyecup sight opening 13 and/or in the snap ring 30. For example, the eyecup sight opening 13 could contain a welder's filter lens and, at the same time, the snap ring 30 could contain the magnification lens 27 and the cover lens 15.

Figures 5, 6:
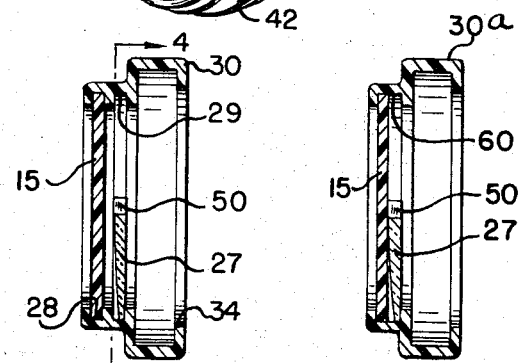
FIG. 5 is a side elevational sectional view of the snap ring assembly shown in FIG. 4.
FIG. 6 is a side elevational sectional view of a modified form of snap ring assembly.

In FIG. 6 there is shown a modified snap ring 30a wherein a single annular groove 60 is provided to receive both lenses 15 and 27.

Figure 7:
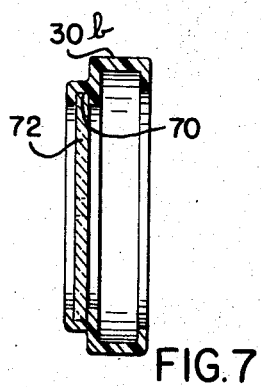
FIG. 7 is a side elevational sectional view of a further modified form of snap ring construction.
Figure 8:
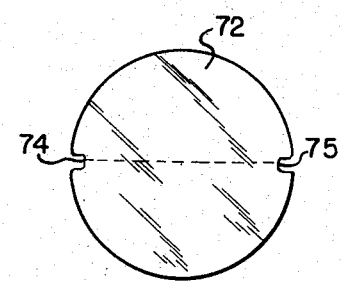
FIG. 8 is a front elevational view of the lens shown in FIG. 7.

Referring to FIGS. 7 and 8, there is shown a modified form of snap ring 30b having a single lens retaining groove 70 for receiving a single bifocal lens 72. The lens 72 may have a pair of spaced notches 74 and 75 for insertion into the aforedescribed tabs 50 and 51.

Figure 10:
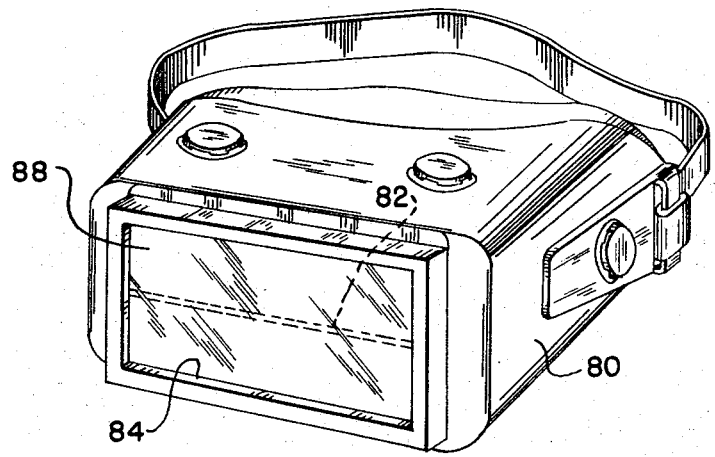
FIG. 10 is a right-hand perspective view of semi-coverall type goggles incorporating the invention.
Figure 11:
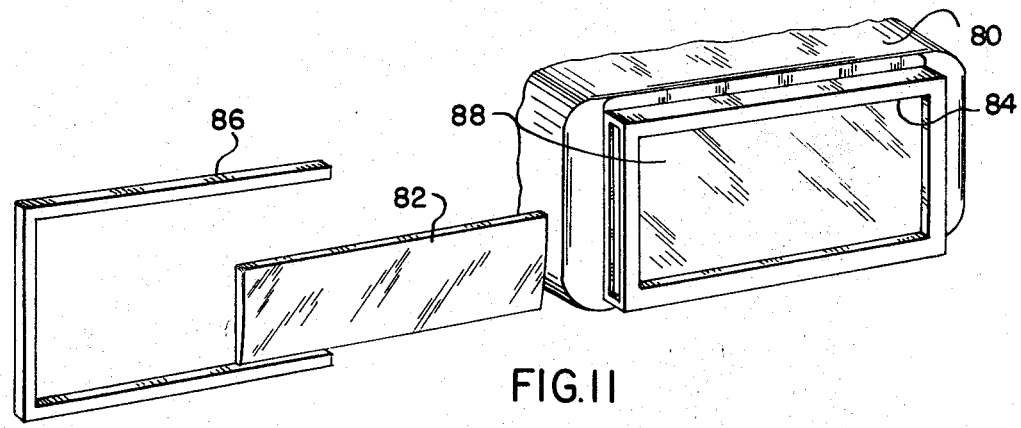
FIG. 11 is an exploded left-hand perspective view of the front portion of the goggles of FIG. 10 and showing the relative position of certain parts thereof prior to assembly.

FIGS. 10 and 11 illustrate the invention in a cover-all type of headpiece 80 wherein a one-half magnification lens 82 may be disposed in a portion of the sight opening 84 of the headpiece with the aid of the inserting frame 86. A cover lens 88 may also be disposed in the sight opening 84 in front of the magnification lens 82 therein. The magnification lens 82 is contoured in planular configuration to occupy either the upper portion or the lower portion of the sight opening 84.

Figure 12:
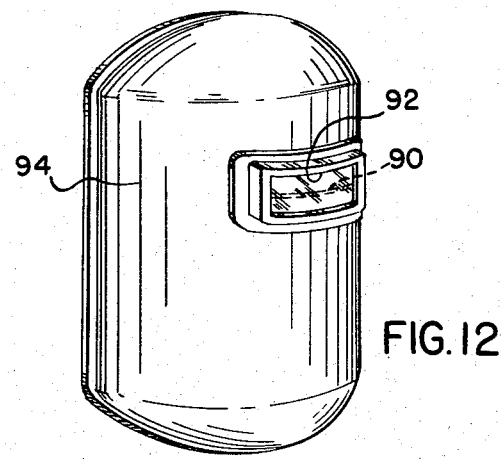
FIG. 12 is a perspective view of a welder's helmet incorporating the invention.

FIG. 12 illustrates a magnification lens 90 of the invention disposed in the sight opening 92 of a welder's helmet 94.

Although the lenses 27, 82 and 90 are shown as half the size of the sight opening, they may be ⅓, ¼ or ¾ or any like suitable size so as to occupy a small or large portion of the sight opening, as desired.

Thus, there is provided inexpensive bifocal viewing in eye protective headpieces. In practice, it may be desirable to have a series of such inexpensive magnification lenses (with various powers of magnification) for each headpiece, thereby enabling the wearer to select a lens or lenses of correct magnification power as called for by the job on hand.

A further advantage of the invention is that it eliminates the necessity of wearing two pairs of eyeglasses; i.e., wearing eyeglasses along with safety goggles. Specifically, a user who normally wears corrective eyeglasses need simply select magnification lens or lenses (27, 82 or 90) of the correct magnification power for his eye protective headpiece. Thus, when such headpiece is worn, eyeglasses are unnecessary.

Also, the magnification lenses 27, 82 or 90 of the invention may be inserted in respective conventional headpieces. For example, the lens 27 may be easily inserted in conventional screw-cup goggles.

The terms and expressions which have been employed are used as terms of description, and not of limitation, and there is no intention, in the use of such terms and expressions, of excluding any equivalents of the features shown and described or portions thereof, but it is recognized that various modifications are possible within the scope of the invention claimed.

What is claimed is:

1. An eye protective headpiece having at least one sight-opening aperture therein, a separable single unitary removable magnification lens of approximately half the size of the aperture and detachably and releasably disposed therein so as to occupy approximately half of the aperture to provide a magnified viewing portion and an unmagnified viewing portion of the aperture to enable the wearer to selectively view an object through the magnified portion for viewing close objects or through the unmagnified portion for viewing distant objects, said headpiece being an eye goggle including an eyecup formed of resilient synthetic organic thermoplastic material and having the sight-opening apertures, said magnification lens being detachably disposed in the sight opening aperture so as to occupy only a portion of the aperture to provide the magnification portiton and the clear portion of the aperture, said eyecup including a separable synthetic organic thermoplastic resilient annular snap ring detachably fitted to the eyecup, said snap ring having a sight opening forming a part of and in line with said sight-opening aperture when the snap ring is operatively positioned on the eyecup, said snap ring having an interior annular lens-retaining groove encircling the opening for detachably receiving said magnification lens, said aperture being circular and said magnification lens being semi-circular, said groove containing a pair of coacting oppositely disposed tabs contacting the flat staright edge of the lens for preventing such lens from sliding circumferentially in the groove, said eyecup having a forwardly disposed outer annular flange encircling the aperture, and said snap ring being detachably fitted over the flange, said flange and snap ring being circular, said snap ring being circumferentially rotatable on said flange thereby enabling the wearer to position the magnification lens in any one of a plurality of circumferential positions on the eyecup.

References Cited

UNITED STATES PATENTS

| | | | |
|---|---|---|---|
| 1,254,296 | 1/1918 | Willson | 2—14.7 |
| 2,333,198 | 11/1943 | Riddell | 2—14.7 |
| 2,628,530 | 2/1953 | Rabben. | |
| 3,259,909 | 7/1966 | Wood | 2—14.7 |
| 3,363,262 | 1/1968 | Lindblom | 2—14 |
| 956,690 | 5/1910 | Donaldson | 351—61 |
| 1,584,259 | 5/1926 | Tully | 2—14.7 |
| 1,735,021 | 11/1929 | Stewart | 351—84 |
| 2,276,102 | 3/1942 | Schwartz | 351—86 |
| 3,147,489 | 9/1964 | Nelson | 2—14.7 |

FOREIGN PATENTS

| | | |
|---|---|---|
| 697,155 | 9/1953 | Great Britain. |
| 138,605 | 9/1950 | Australia. |
| 742,251 | 12/1932 | France. |
| 1,399,517 | 4/1965 | France. |

OTHER REFERENCES

"The Optician," vol. XCIV, p. 235, November 1937. (Photo-copy in 351/41.)

DAVID H. RUBIN, Primary Examiner

U.S. Cl. X.R.

351—84, 86; 352—14